United States Patent [19]

Kowalik et al.

[11] Patent Number: 4,625,745
[45] Date of Patent: Dec. 2, 1986

[54] DRAG REDUCTION AGENTS FOR HYDROCARBON SOLUTIONS

[75] Inventors: Ralph M. Kowalik, Bridgewater; Ilan Duvdevani, Leonia, both of N.J.; Kissho Kitano, Ohi, Japan; Donald N. Schulz, Annandale, N.J.

[73] Assignee: Exxon Research and Engineering Company, Florham Park, N.J.

[21] Appl. No.: 757,362

[22] Filed: Jul. 22, 1985

Related U.S. Application Data

[63] Continuation-in-part of Ser. No. 626,018, Jun. 29, 1984, abandoned, which is a continuation-in-part of Ser. No. 565,159, Dec. 23, 1983, abandoned.

[51] Int. Cl.$^4$ ................................................ F17D 1/16
[52] U.S. Cl. .................................. 137/13; 252/8.551; 525/203
[58] Field of Search .............. 525/203, 221, 217, 233; 252/8.55 R, 8.5 M; 137/13

[56] References Cited

U.S. PATENT DOCUMENTS

| | | | |
|---|---|---|---|
| 3,692,676 | 9/1972 | Culter et al. | 252/8.55 |
| 3,758,406 | 9/1973 | Malone et al. | 252/8.55 |
| 3,776,247 | 12/1973 | Choufoer et al. | 137/13 |
| 3,957,659 | 5/1976 | van de Kraats et al. | 137/13 X |
| 4,508,128 | 4/1985 | Kowalik et al. | 137/13 |

Primary Examiner—Herbert B. Guynn
Attorney, Agent, or Firm—Richard E. Nanfeldt

[57] ABSTRACT

A method for reducing the frictional drag of an organic liquid in flow through pipes or conduits having a continuous bore therethrough which comprises adding about 0.001 to about 0.5 grams of a polymeric complex to said organic liquid, wherein the polymeric complex is the reaction product of a copolymer containing an alpha-olefin and vinyl alkylenecarboxylic acid and a basic nitrogen-containing compolymer, wherein said acid copolymer of alpha-olefin and vinyl alkylenecarboxylic acid has the formula:

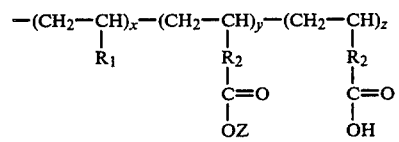

wherein $R_1$ is an alkyl group having 1 to 25 carbon atoms, Z is an alkyl group having about 1 to about 25 carbon atoms, $R_2$ is an alkylene group having about 3 to about 17 carbon atoms, x is about 95.0 to about 99.99 mole % and y is about 5.0 to about 0.01 mole % and z is about 0.01 to about 5.0 mole percent, said basic nitrogen containing polymer being a copolymer of vinyl pyridene with another monomer selected from the group consisting of styrene, t-butyl styrene, alkylacrylate, alkyl methacrylate butadiene, isoprene, vinyl chloride and acrylonitrile.

4 Claims, No Drawings

DRAG REDUCTION AGENTS FOR HYDROCARBON SOLUTIONS

This application is a continuation-in-part of application Ser. No. 626,018, filed June 29, 1984, which is a continuation-in-part of application Ser. No. 565,159, filed Dec. 23, 1983, both now abandoned.

FIELD OF THE INVENTION

The present invention relates to a family of novel and efficient drag reduction agents for a variety of hydrocarbon solutions which comprise a family of polymeric complexes which are polymer A which is a copolymer of alpha-olefin and a vinyl alkylenecarboxylic acid side groups randomly attached along its backbone and polymer B which is a copolymer of styrene and vinyl pyridine.

BACKGROUND OF THE INVENTION

To flow liquids in pipes, energy must be expended to overcome frictional losses. This energy is extracted from the liquid pressure, which decreases along the pipe in the direction of flow. For a fixed pipe diameter, these pressure losses increase with increasing flow rate until a maximum is reached when the pressure drop along the pipe equals the maximal supply pressure dictated by the pumping device or pipe strength. When flow in the pipe is turbulent (flow Reynolds number=means fluid velocity $\times$ pipe diameter $\div$ fluid kinematic viscosity greater than about 2000) this maximum flow rate can be increased by the addition of small amounts of certain high molecular weight linear polymers to the liquid. These polymers interact with the turbulent flow processes and reduce frictional pressure losses such that the pressure drop for a given flow rate is less, or the maximum flow rate for a given pressure drop is larger. This phenomenon is commonly called drag reduction. It has been used in commercial oil pipelines, fire hoses and storm sewers to increase the flow capacities of existing systems. It can also be used to reduce supply pressures, pumping costs, and/or pipe diameters for given flow capacities.

High molecular weight hydrocarbon soluble polymers such as polyisobutylene, polystyrene, and several poly alpha-olefins have been demonstrated to reduce drag in turbulent flows of hydrocarbon liquids. Generally, the drag reduction effectiveness of these polymers improves with increasing molecular weight; however, the tendency for the polymers to permanently degrade via molecular scission within pumps or turbulent pipeflows also increases with increasing polymer molecular weight. This invention discloses efficient drag reduction in hydrocarbon liquids resulting from a novel class of interacting polymers which interact via an acid-base mechanism. For example a copolymer of an alpha-olefin such as 1-octene incorporating a repeat unit containing a carboxylic acid such as 10-undecenoic acid can interact with a styrene-vinyl pyridine copolymer. Such acid-base interacting polymers can provide improved drag reduction via polymeric networks rather than by high molecular weight. Consequently such networks are less sensitive to flow degradation as exemplified in the instant invention.

This invention teaches that an acid-base interacting polymer complex can be effective as a drag-reducing agent for hydrocarbon solutions. Such a system formed by two interacting polymers, one acidic and one basic, can behave like a higher molecular weight polymer which is normally needed for drag reduction. One can, therefore, form a network from polymers that are relatively lower in molecular weight and potentially reduce sensitivity to backbone degradation under flow. Moreover, the network can be destroyed by adding a small amount of a polar cosolvent additive, such as an alcohol or other polar additives, which is strongly interfering with the interaction mechanism.

We note that high molecular weight polymeric materials in general, are considered useful as drag reduction agents when dissolved in an appropriate solvent system. The major reason for this reduction in fluid drag is due in large part to the very large dimensions of the individual polymer chain as compared to the dimension of the single solvent molecules. Any increase in size of the polymer chain will produce a corresponding enhancement in the drag reduction. This effect is maximized, when the polymer is dissolved in a "good" solvent. Therefore, in general, a hydrocarbon soluble polymer is useful in hydrocarbon solvents while a water soluble polymer is appropriate in aqueous systems.

SUMMARY OF THE INVENTION

The present invention relates to improved drag reduction agents for hydrocarbon solutions. The drag reduction agents of the instant invention are acid base interacting polymers formed from Polymer A and Polymer B, wherein Polymer A has an alpha-olefin (1-octene) backbone with alkylenecarboxylic acid side groups having about 2 to 18 carbon atoms, wherein the carboxylic acid groups are randomly distributed along the alpha-olefin backbone and polymer B is a copolymer of styrene/vinyl pyridine or other basic nitrogen containing polymer.

GENERAL DESCRIPTION

The present invention relates to a method for reducing the frictional drag of an organic hydrocarbon liquid in flow through pipes or conduits having a continuous bore therethrough, which method comprises adding a quantity of a polymeric complex to the organic hydrocarbon liquid, wherein the polymeric complexes are the reaction products of an alpha-olefin polymer having alkylenecarboxylic acid side groups randomly distributed along the polymeric backbone of the alpha-olefin and a basic nitrogen-containing polymer.

Polymer A which is a copolymer containing an alpha-olefin and a vinyl alkylenecarboxylic acid having about 4 to about 20 carbon, more preferably about 9 to about 18 and most preferably about 10 to about 16, wherein the resulting alkylenecarboxylic acid side groups are randomly distributed along the alpha-olefin backbone. The alpha-olefin has about 3 to about 27 carbon atoms, more preferably about 6 to about 25, and most preferably about 6 to about 18. The copolymer contains about 0.01 to about 5 mole percent of the alkylenecarboxylic acid side groups more preferably about 0.05 to about 3 and most preferably about 0.1 to about 2. The number average molecular weight as measured by GPC of the alpha-olefin copolymer is about 10,000 to about 20,000,000, more preferably about 50,000 to about 15,000,000, and most preferably about 100,000 to about 10,000,000. The copolymer of the alpha-olefin and vinyl alkylenecarboxylic acid is formed by one of two methods. The first method comprises partially hydrolyzing ester groups with concentrated sulfuric acid or other suitable acids having a sufficiently low Ph to effect hydrolysis, wherein the hydrolysis occurs in a solvent which is inert itself to hydrolysis such as an aliphatic or aromatic hydrocarbon. The partial hydrolysis of the copolymer of an alpha-olefin and a vinyl alkylene ester is represented by the reaction scheme:

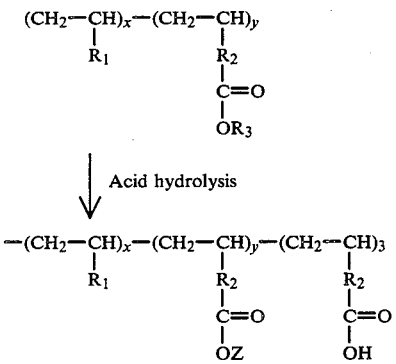

wherein Z is $R_3$, wherein $R_3$ is an alkyl group having about 1 to about 25 carbon atoms, wherein Z is $R_3$, $R_1$ is an alkyl group having about 1 to about 25 carbon atoms, $R_2$ is an alkylene group having about 3 to about 17 carbon atoms, x is about 99.99 to about 95.0 mole percent, more preferably about 99.95 to about 97.0 and most preferably about 99.90 to about 98.0. (y) is about 0.01 to about 2.0 mole percent and z is about 0.01 to about 5.0 mole percent. The final hydrolyzed product is a mixture of ester species and acid species, wherein the mixture contains about 0.1 to about 50 wt.% of the acid species, more preferably about 2 to about 40, and more preferably about 4 to about 20.

The second method comprises first hydrolyzing the organic ester with base and then subsequently treating with concentrated sulfuric acid or other suitable acids having a sufficiently low Ph. The hydrolysis occurs in a solvent which is inert itself to hydrolysis such as an aliphatic or aromatic hydrocarbon. The substantially complete hydrolysis of the copolymer of an alpha-olefin and a vinyl alkylene ester by a base followed by acid treatment is represented by the following reaction scheme:

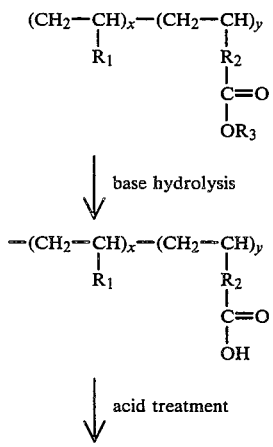

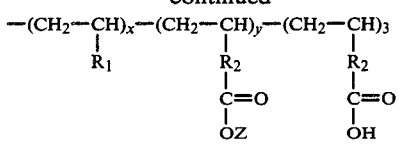

wherein Z is an alkyl groups having about 1 to about 25 carbon atoms, $R_1$ is an alkyl group having about 1 to about 25 carbon atoms, $R_2$ is an alkylene group having about 3 to about 17 carbon atoms, $R_3$ is an alkyl group having about 1 to about 25 carbon atoms, x is about 99.99 to about 95.0 mole percent, more preferably about 99.95 to about 97.0 and most preferably about 99.90 to about 98.0, y is about 0.01 to about 2.0 mole percent and z is about 0.01 to 5.0 mole percent. Suitable bases used in the first hydrolysis step of the ester are selected from the group consisting of $tBuO^-$, $OH^-$, $nBuO^-$, $EtO^-$, and $PrO^-$. Suitable acids used in the second hydrolysis step are selected from the group consisting of $H_2SO_4$, HCl, $H_3PO_4$, $HNO_3$, and toluene sulfonic acid.

The basic nitrogen-containing copolymer, such as styrene-vinyl pyridine copolymer, polymer B of the interacting polymer complex is formed by free radical copolymerization using techniques well-known in the polymer literature. Such polymers can be prepared by polymerizing by a variety of techniques a basic nitrogen-containing monomer such as vinyl pyridine with styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable. The amount of vinyl pyridine in the basic nitrogen-containing polymer can vary widely, but should range from less than 50 mole percent down to at least 0.5 mole percent. Preferably, the amine content in the basic polymer is expressed in terms of basic nitrogen. In this respect, the nitrogen content in amides and similar nonbasic nitrogen functionally is not part of the interacting species.

A minimum of three basic groups must be present on the average per polymer molecule and the basic nitrogen content generally will range from 4 meq. per 100 grams of polymer up to 500 meq. per 100 grams, more preferably about 8 to 200 meq.

The polymer complex of the alpha-olefin/vinyl alkylenecarboxylic acid copolymer and the basic nitrogen-containing copolymer is formed by mixing together a first solution of the alpha-olefin/vinylalkylenecarboxylic acid copolymer in an organic liquid and a second solution of the basic nitrogen-containing copolymer in the organic liquid. The organic liquid which has a solubility parameter of less than 9.5 and is selected from the group consisting of mineral oil, synthetic oil, alkanes, cycloalkanes and aromatics and mixtures thereof. The concentration of the alpha-olefin/vinyalylenecarboxylic acid copolymer formed by either acid hydrolysis or a base hydrolysis/acid treatment in the first solution is about 0.05 to about 10 grams per 100 ml of organic liquid, more preferably about 0.1 to about 5. The concentration of the basic nitrogen-containing polymer styrene-vinyl pyridine copolymer in the second solution is about 0.05 to about 10 grams per 100 ml of the organic liquid, more preferably about 0.1 to about 5, and most preferably about 0.1 to about 2. Any of the two solutions of the alpha-olefin/vinyl alkylenecarboxylic acid copolymer or styrene-vinyl pyridine copolymer can be substantially in excess of the other. Alternatively the polymers can be codissolved in the solvent of interest. The formation of the complex is schematically represented by:

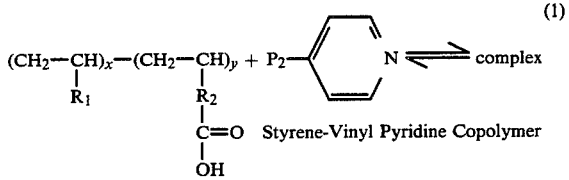

For drag reduction, the concentration of the complex thus formed is further reduced by dilution.

The final concentration of the polymeric complex as a drag reduction agent in the organic hydrocarbon liquid is about 0.001 to about 0.5 grams per 100 ml of the organic hydrocarbon liquid, more preferably about 0.005 to about 0.1.

DESCRIPTION OF THE PREFERRED EMBODIMENTS

The following examples illustrate the present invention without; however, limiting the same hereto.

EXAMPLE 1

SYNTHESIS OF POLY(1-OCTENE) HAVING ALKYLENECARBOXYLIC ACID SIDE CHAINS (a) Copolymerization of 1-Octene and methyl-10-undecenoate A 2-liter flask was charged with a mixture of n-heptane (480 ml), 1-octene (500 ml), methyl-10-undeenoate (6.4 g), and diethyl aluminum chloride (72 m mole), and heated to 60° C.

The catalyst containing $TiCl_3$ (described in U.S. Pat. No. 4,240,928) (2.0 g) was then added with n-heptane (20 ml). After stirring for 1 hour, the reaction was terminated with a small amount of isopropyl alcohol.

The polymer was precipitated and washed with isopropyl alcohol and vacuum dried at 60° C. to yield 87.9 g of colorless material. IR spectrum showed that the copolymer contained 0.8 mole percent of methyl-10-undecenoate unit. Intrinsic viscosity was about 4.3 dl/g in a decalin solution. $\overline{M}n$ was $4.6 \times 10^6$ by means of GPC.

(b) Acid hydrolysis of 1-octene-methyl-10-undecenoate copolymer-Polymer A1

1-Octene-methyl-10-undecenoate copolymer similar to the one described in (a) above was converted to a respective copolymer having alkylenecarboxylic acid side chains as described below.

A solution of the copolymer (10 g) in xylene (500 g) was placed in a 2-liter flask and heated to 40° C. Concentrated sulfuric acid (20 ml) was then added. After stirring for one hour, the reaction mixture was cooled down and washed with a mixture of water and isopropyl alcohol three times.

A white product was finally obtained by precipitating from the solution with isopropyl alcohol. Further purification by reprecipitation and drying in a vacuum oven at 50° C. gave 8.0 g of colorless rubbery polymer.

(c) Base Hydrolysis

A flask was charged with a solution of 1-octene-methyl-10-undecanoate copolymer similar to the one described in (a) above (4.0 g) in 200 g THF and 0.82 g t-BuOK. The solution was heated to 50°-60° C. After one hour another 150 ml THF was added and 3.6 ml of 2N $H_2SO_4$ was added to neutralize the solution (Ph=5). After cooling, the polymer was precipitated in 600 ml of water/isopranol (1:1 vol./vol.). The polymer was filtered washed with water and isopranol, and dried to yield 4.0 g of product which had about 100% of the original ester groups hydrolyzed to carboxyl groups by IR. The viscosity of this polymer in xylene (2%) was 19 cP at $30s^{-1}$.

(d) Acid Treatment-Polymer A2

2.0 g of the polymer prepared according to Example 1(c) was dissolved in 100 g xylene. A 3 ml quantity of concentrated $H_2SO_4$ was added at room temperature. The batch was stirred for 1 hour at room temperature and subsequently precipitated in isopranol/water and dried under vacuum with heating. The polymer showed carbonyl and ester groups in the IR (75% COOH), and surprisingly showed an enhanced viscosity of 34 cP at $30s^{-1}$ at 2% concentration in xylene, which is higher than the solution viscosity shown in (c) above.

EXAMPLE 2

Synthesis of Styrene-Vinylpyridine Copolymer Polymer B

A representative example for the synthesis of styrene-4-vinylpyridine copolymer (SVP) is outlined below.

Into a 1-liter 4-neck flask the following ingredients were introduced:
100 g distilled styrene
6.4 g sodium lauryl sulfate
240 ml. distilled water
0.4 g potassium persulfate
9.4 g 4-vinylpyridine The solution was purged with nitrogen gas for 10 minutes to remove dissolved oxygen. As the nitrogen gas purge began, the solution was heated to 55° C. After 24 hours, the polymer was precipitated from solution with methanol. Subsequently, the resulting polymer was washed several times with a large excess of methanol and dried in a vacuum oven at 60° C. for 24 hours. Elemental analysis showed a nitrogen content of 1.13 weight percent which corresponds to 8.4 mole percent 4-vinyl-pyridine.

EXAMPLE 3

Polymeric Systems and Solutions

Polymer A1 having acid functionalities and polymer B having base functionalities were separately dissolved in xylene at 1 weight percent concentration. Various mixtures of these two solutions were prepared.

Polymer A1, prepared by acid hydrolysis according to the procedure of Example 1(b), has a 1-octene backbone with $—(CH_2)_8—COOH$ alkylenecarboxylic acid side groups randomly attached along the backbone. The carboxylic acid level is in the order of 0.02–0.5 mole percent. The average molecular weight is about 2 million based on an intrinsic viscosity in xylene of about 3.5.

Polymer B, prepared according to the procedure of Example 2, is a copolymer of styrene and vinyl pyridine with a pyridine level of about 8 mole percent and viscosity average molecular weight of about 2 million.

Mixtures of the xylene solutions at 1 weight percent each were blended and the resulting solution viscosities at 25° and 30 sec$^{-1}$ are shown in Table I.

TABLE I

Viscosities of Acid-Base Network Solutions in Xylene at 1 weight percent polymer

| Composition | | |
|---|---|---|
| Polymer A1 Parts | Polymer B Parts | Viscosity cP at 25° C. and 30 sec$^{-1}$ |
| 100 | 0 | 171 |
| 97.5 | 2.5 | 571 |
| 95 | 5 | 879 |
| 90 | 10 | 358 |
| 0 | 100 | 8.5 |

The mixture viscosities in Table I increased significantly over the viscosities of the individual components and peaked at a ratio of about 95/5 by weight for Polymer A1 to Polymer B. The peak ratio is approximately at a stoichiometric concentration of acid to base functionalities.

Polymer A2 having acid functionalities and prepared by base hydrolysis followed by acid treatment according to Example 1(c, d) was interacted in xylene solution with polymer B described above. Both polymers were separately dissolved in xylene at 0.5 weight percent and various mixtures of the two solutions were prepared yielding a total polymer complex concentration in xylene of 0.5 weight percent. The solution viscosities at 25° C. and 30 sec$^{-1}$ were measured by a Haake CV-100 viscometer and are shown in Table II.

TABLE II

Viscosities of Acid-Base Network Solutions in Xylene at 0.5 Weight Percent Polymer

| Composition | | |
|---|---|---|
| Polymer A2 Parts | Polymer B Parts | Viscosity cP at 25° C. and 30 sec$^{-1}$ |
| 100 | 0 | 2.2 |
| 95 | 5 | 92 |
| 90 | 10 | 140 |
| 85 | 15 | 38 |
| 50 | 50 | 10 |
| 0 | 100 | 2.6 |

In Table II, mixture viscosities are significantly higher than the viscosities of the individual components as was shown in Table I.

This example shows that polymers A1 and B, and A2 and B can interact to increase solution viscosity as would be expected from increasing molecular weight. It suggests therefore that larger structures are formed as a result of the interation.

EXAMPLE 4

Destruction of a Network in Solution

A network of acid-base interacting polymers in solution was prepared by blending solutions of two polymers at 0.5 weight percent concentration in xylene each.

One polymer, polymer C, prepared by acid hydrolysis according to the procedure of Example 1, is similar to polymer A1 of Example 3 the only difference being the level of carboxylic acid which was in the order of 0.3–1.0 mole percent. The other polymer was polymer B of Example 3.

The two solutions were mixed at a ratio of 97.5 parts of polymer A to 2.5 parts of polymer B. The resulting viscosity was about 400 cP at 25° C. and 20 sec$^{-1}$. Upon addition of 1 weight percent methanol to this polymer network solution the viscosity dropped to about 2.4 cP at 25° C. and 20 sec$^{-1}$.

This example shows that a network of acid-base interacting polymers in solution can be effectively and selectively destroyed by the addition of a proper agent such as methanol, at relatively low concentration.

EXAMPLE 5

Drag Reduction of Novel Acid-Base Interacting Polymers

Drag reduction was evaluated by flowing polymer/xylene solutions through a 2.13 mm inside diameter stainless steel tube and measuring the resulting frictional pressure drops and flow rates. The flows were generated by loading a pair of stainless steel tanks (1 liter each) with a previously dissolved polymer/xylene solution, pressurizing the tanks with nitrogen gas (300 kPa) and discharging the solution through the tube test section. Pressure drops were measured across a 50 cm straight segment of the tube with a pair of flush mounted tube wall pressure taps and a differential pressure transmitter. Flow rates were measured by weighing samples of the effluent liquid collected over measured time periods.

Flow rates in the drag reduction experiments ranged from about 12 to 25 g/s; these corresponded to solvent Reynolds numbers from about 12,000 to 25,000 (solvent Reynolds number=mean flow velocity×tube diameter÷solvent kinematic viscosity). Drag reduction was measured by comparing flow rates of the polymer/xylene solutions with flow rates of the xylene solvent at equal pressure drops. Results were expressed as percent flow enhancement which is defined as $$\text{Percent Flow Enhancement} = 100 \times \frac{\text{Flow Rate of solution} - \text{Flow Rate of solvent}}{\text{Flow Rate of solvent}}$$

The sensitivity of the solutions to flow degradation was evaluated by recycling solutions through the system. Under these conditions flow enhancement values decrease on successive passes when flow degradation occurs.

(a) Typical drag reduction results for a pair of novel acid-base interacting polymers and a similar pair of non-interacting polymers are given in Table 3. These results demonstrate that the acid-base interacting polymer solution, where the acid polymer (A1 of Example 1(b)) was prepared by acid hydrolysis, has a higher initial level of flow enhancement and a greater resistance to flow degradation. Both effects are attributed to the acid-base interactions among the polymers.

TABLE III

Flow Enhancement Results For Acid-Base Interacting and Similar Non-Interacting Polymers
% Flow Enhancement for Pressure Drop of 112 kPa/m

| Pass | 375 ppm Polymer A1 375 ppm Polymer B | 375 ppm Polymer D 375 ppm Polymer B |
|---|---|---|
| 1 | 106 | 69.2 |
| 2 | 106 | 57.4 |
| 3 | 105 | 55.4 |
| 4 | 107 | 51.6 |
| 5 | 107 | 52.7 |

TABLE III-continued

Flow Enhancement Results For Acid-Base
Interacting and Similar Non-Interacting Polymers
% Flow Enhancement for Pressure Drop of 112 kPa/m

| Pass | 375 ppm Polymer A1<br>375 ppm Polymer B | 375 ppm Polymer D<br>375 ppm Polymer B |
| --- | --- | --- |
| 6 | 108 | 52.5 |

Polymers A1 and B are the same polymers described in Example 3. Polymer D (10363-50) is a 1-octene homopolymer with an average molecular weight and polydispersity approximately equal to those of Polymer A1.

(b) Drag reduction results for a second pair of acid-base interacting polymers where the acid polymer (polymer A3) was prepared by base hydrolysis followed by acid treating, are shown in Table IV. Polymer A3 is similar to polymer A2 of Example 1(d).

TABLE IV

Flow Enhancement Results for
Acid-Base Interacting Polymers in Xylene
% Flow Enhancement for Pressure Drop of 112 kPa/m

| Pass | 250 ppm Polymer A3/250 ppm Polymer B |
| --- | --- |
| 1 | 93.2 |
| 3 | 95.3 |
| 4 | 92.2 |
| 5 | 93.1 |
| 6 | 93.8 |

The results in Table IV demonstrate effective drag reduction and stability for a polymeric acid-base interacting agent whers followed by acid treatment. The precursor for polymer A3, before acid treatment, did not show the same degree of stability shown in Table IV.

What is claimed is:

1. A method for reducing the frictional drag of a hydrocarbon liquid in flow through pipes or conduits having a continuous bore therethrough which comprises adding about 0.001 to about 0.5 grams of a polymeric complex to 100 ml. of said hydrocarbon liquid, wherein the polymeric complex is the reaction product of a copolymer containing an alpha-olefin and vinyl alkylenecarboxylic acid and a basic nitrogen-containing copolymer, wherein said acid copolymer of alpha-olefin and vinyl alkylenecarboxylic acid has the formula:

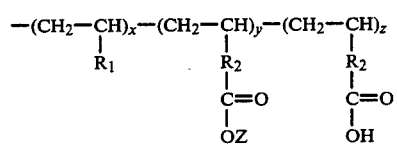

wherein $R_1$ is an alkyl group having 1 to 25 carbon atoms, Z is an alkyl group having about 1 to about 25 carbon atoms, $R_2$ is an alkylene group having about 3 to about 17 carbon atoms, x is about 95.0 to about 99.99 mole % and y is about 5.0 to about 0.01 mole % and z is about 0.01 to about 5.0 mole percent, said basic nitrogen containing polymer being a copolymer of vinyl pyridine with another monomer selected from the group consisting of styrene, t-butyl styrene, alkylacrylate, alkyl methacrylate, butadiene, isoprene, vinyl chloride and acrylonitrile.

2. A method according to claim 1, wherein said basic nitrogen containing copolymer is a styrene/vinyl pyridine copolymer which contains about 0.5 to about 50 mole percent of vinyl-pyridine.

3. A method according to claim 1 wherein said carboxylic acid containing polymer is in excess of said basic nitrogen containing polymer.

4. A method according to claim 1, wherein said basic nitrogen containing polymer is in excess of said carboxylic acid containing polymer.

* * * * *